(12) United States Patent
Howard

(10) Patent No.: US 10,850,208 B2
(45) Date of Patent: Dec. 1, 2020

(54) SYSTEMS AND METHODS FOR TRANSCENDENTAL LIGHTING APPLICATIONS

(71) Applicant: T. Dashon Howard, Chicago, IL (US)

(72) Inventor: T. Dashon Howard, Chicago, IL (US)

( * ) Notice: Subject to any disclaimer, the term of this patent is extended or adjusted under 35 U.S.C. 154(b) by 0 days.

(21) Appl. No.: 15/939,992

(22) Filed: Mar. 29, 2018

(65) Prior Publication Data

US 2019/0299112 A1 Oct. 3, 2019

(51) Int. Cl.
| | | |
|---|---|---|
| *A63H 33/08* | (2006.01) | |
| *A63H 33/04* | (2006.01) | |
| *H04R 17/00* | (2006.01) | |
| *F21V 23/02* | (2006.01) | |
| *G10K 11/04* | (2006.01) | |
| *H02N 2/18* | (2006.01) | |

(52) U.S. Cl.
CPC ......... *A63H 33/042* (2013.01); *A63H 33/046* (2013.01); *A63H 33/08* (2013.01); *F21V 23/02* (2013.01); *G10K 11/04* (2013.01); *H02N 2/186* (2013.01); *H04R 17/00* (2013.01)

(58) Field of Classification Search
CPC .... A63H 33/042; A63H 33/046; A63H 33/08; H04R 17/00; F21V 23/02; G10K 11/04; H02N 2/186

USPC .............................................. 446/91, 85, 72
See application file for complete search history.

(56) References Cited

U.S. PATENT DOCUMENTS

| | | | | |
|---|---|---|---|---|
| 3,662,486 | A * | 5/1972 | Freedman | A63F 9/088 |
| | | | | 220/DIG. 13 |
| 3,728,201 | A * | 4/1973 | Stroehmer | A47G 33/08 |
| | | | | 156/257 |
| 7,018,690 | B2 * | 3/2006 | Lee | A63F 9/1208 |
| | | | | 362/154 |
| 8,398,368 | B2 * | 3/2013 | Battisti | F03D 7/042 |
| | | | | 416/1 |
| 9,339,736 | B2 * | 5/2016 | Howard | G09B 23/18 |
| 9,731,215 | B2 * | 8/2017 | Howard | G09B 23/18 |
| 2015/0283474 | A1 * | 10/2015 | Howard | G09B 23/18 |
| | | | | 446/91 |
| 2016/0228786 | A1 * | 8/2016 | Howard | G09B 23/18 |

\* cited by examiner

*Primary Examiner* — Vishu K Mendiratta

(74) *Attorney, Agent, or Firm* — Schwegman Lundberg & Woessner, P.A.

(57) ABSTRACT

Enhanced building blocks may be formed from one or more basic shapes. Enhanced building blocks may include magnetic materials (e.g., magnets, ferromagnetic metals), piezoelectric materials, or lights (e.g., LEDs). Enhanced building blocks may be combined to form or give the appearance of various geometric structures, and may be used in various lighting applications.

18 Claims, 4 Drawing Sheets

SYSTEMS AND METHODS FOR TRANSCENDENTAL LIGHTING APPLICATIONS

FIELD

The present invention relates to building blocks, and specifically to educational and lighting building blocks.

BACKGROUND

Planar geometric structures may be assembled in various configurations to form various three-dimensional (3-D) geometric structures. The structures may be used as an educational toy by children, or may be used by adults or children to explore various geometric structures.

DETAILED DESCRIPTION

Enhanced building blocks may be formed from one or more basic shapes. Enhanced building blocks may include magnetic materials (e.g., magnets, ferromagnetic metals), piezoelectric materials, or lights (e.g., LEDs). Enhanced building blocks may be combined to form or give the appearance of various geometric structures, and may be used in various lighting applications.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

Figure 1:
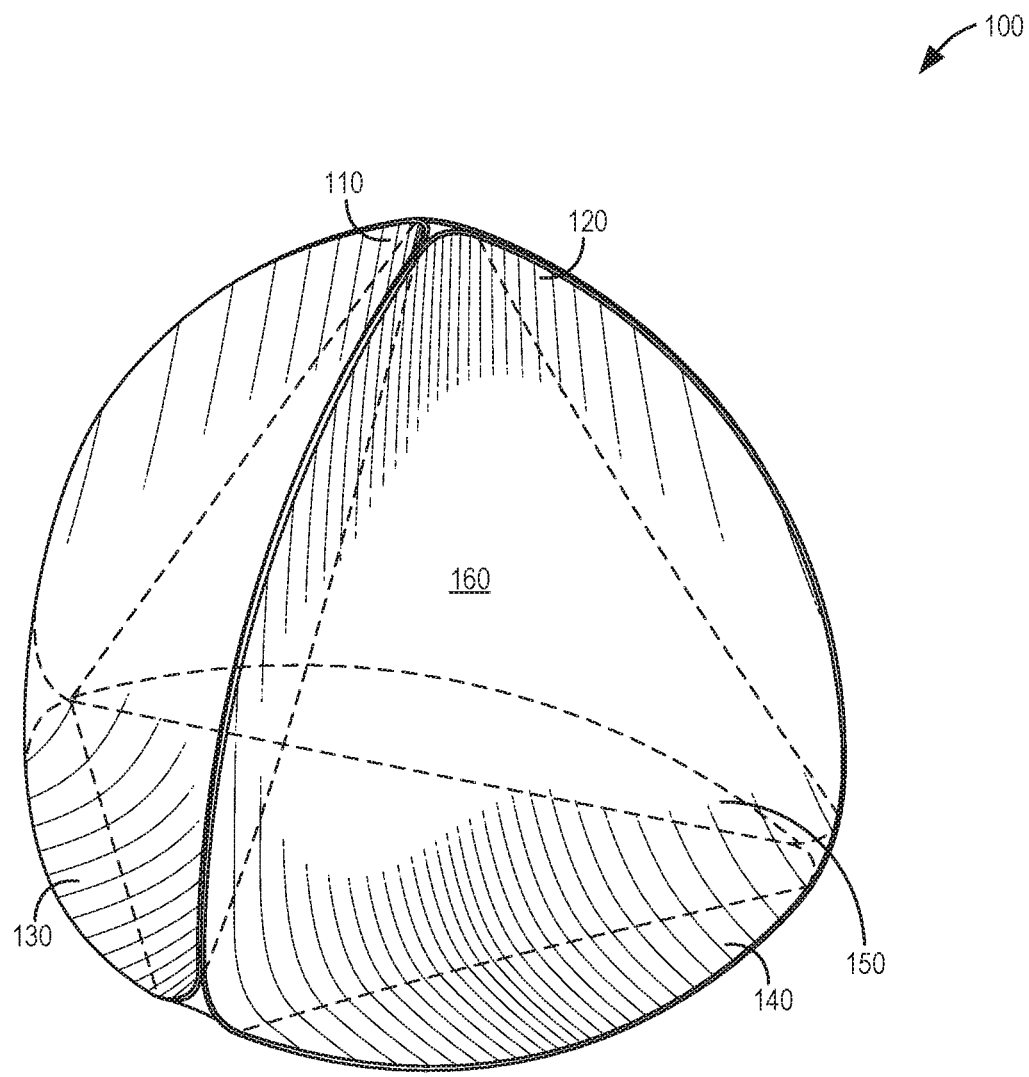
FIG. 1 is a perspective view of a tetrahedral building block.

FIG. 1 is a perspective view of a tetrahedral building block 100. The tetrahedral building block 100 may include four connected circular faces. The flanges of four such circular faces may be connected to form tetrahedral flanges 110, 120, 160, 140, and 150. The circular faces may be connected such that the flanges 110, 120, 160, 140, and 150 are flat, and the triangles inscribed in each of the four connected circular faces may form a tetrahedral inner space 160. In other embodiments, the circular faces may be connected at or near the circumference of each circular face such that the flanges 110, 120, 160, 140, and 150 define an inner volume (e.g., inner pocket). The outermost arcuate portions of the tetrahedral flanges 110, 120, 160, 140, and 150 may define a spherical volume that corresponds with the circumscribed sphere (e.g., circumsphere) surrounding the tetrahedral inner space 160.

Figure 2A:
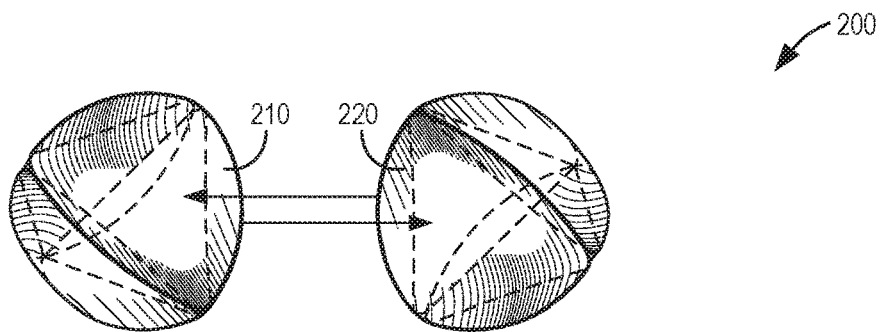
FIGS. 2A-2C are perspective views of two tetrahedral building blocks combined to form a standing wave block in accordance with an embodiment.
Figure 2B:
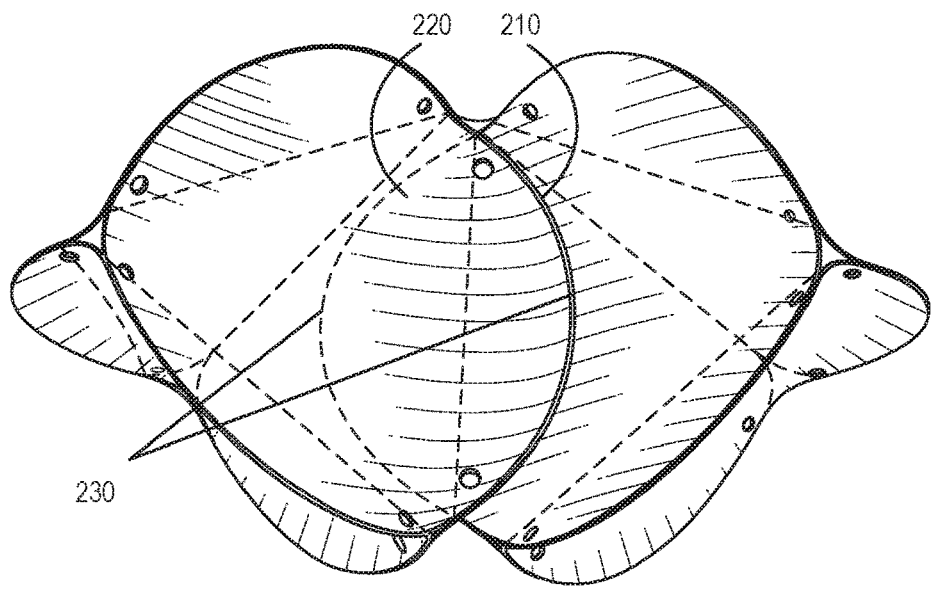
Figure 2C:
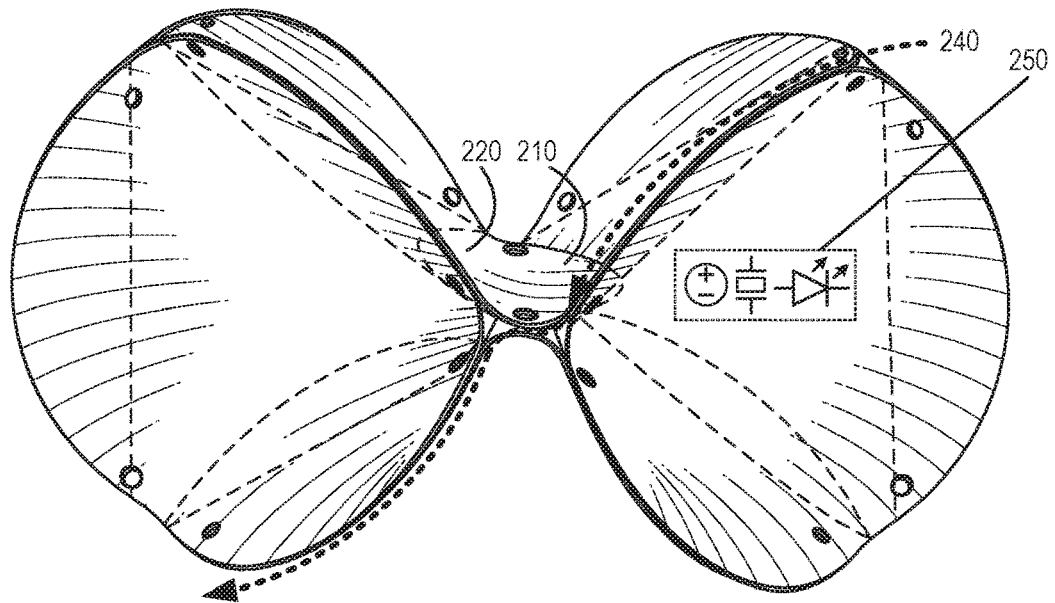

FIGS. 2A-2C are perspective views of two tetrahedral building blocks combined to form a standing wave block 200 in accordance with an embodiment. The standing wave block 200 may be formed by combining two tetrahedral building blocks such that flange 210 and flange 220 overlap. The overlap of flange 210 and flange 220 may form a vesica piscis 230 (e.g., "cat eye" shape). Flange 210 and flange 220 may be combined by affixing flange 210 and flange 220 to each other. Flange 210 and flange 220 may be combined by splitting either flange 210 or flange 220 to overlap the other flange, or may be formed by interleaving flange 210 and flange 220.

The structure of the standing wave block 200 may be used to provide various electrical features. For example, a conductor 240 may be formed along an outer edge of various flanges within the standing wave block 200 to conduct energy across the standing wave block 200. The conductor may be arranged to form a conductive helical structure 240 (e.g., spiral conductor). The conductive helical structure 240 may be used to form various electrical components, such as an inductor, a solenoid, a helical antenna, a helical transmission line, or other electrical components with a spiral or helical structure. The standing wave block 200 may be combined with additional standing wave blocks 200 to convey energy along a longer helical chain structure.

One or more of the standing wave block 200, equal and opposite block 300 or mated block 400 may be used in lighting applications. One or more electrical components 250 may be embedded within an enhanced two-dimensional surface or within an enhanced three-dimensional shape. The electrical components 250 may include a light source to generate luminescent light, incandescent light, or other light for use in lighting applications. In a luminescent light example, a light emitting diode (LED) may be used to provide electro-luminescence, where LEDs may be bulb LEDs with two exposed contacts, may be substantially two-dimensional flexible organic light-emitting diode (OLEDs), or other types of light emitting component. The electrical components 250 may include a power source, such as a power storage element (e.g., capacitor, battery), a power-generating element (e.g., solar cell, piezoelectric component), or other power source. Electrical components 250 may receive power through electrically conductive grid lines, where the grid lines may be mounted to an edge, may be arranged within the enhanced two-dimensional surface, or may be arranged within an inner space of the enhanced building block. The electrically conductive grid lines may conduct power to the electrical components 250 for educational purposes. For example, two enhanced devices may detect proximity using a magnetic or other proximity detection mechanism, and the proximity detection may convey power to the electrical components 250 to indicate that the enhanced devices have been placed in the correct arrangement. The electrically conductive grid lines may serve as contour lines for educational purposes. For example, a two-dimensional surface with a grid pattern may be used to form one or more curved enhanced surfaces, and the curved enhanced surfaces will exhibit a visual distortion of the grid pattern according to the curvature of each surface. In another example, one or more enhanced surfaces may be formed using OLEDs or liquid crystal displays (LCDs), and may display various human-readable or machine-readable information. The surfaces, edges, and other physical features of the standing wave block 200, equal and opposite block 300 or mated block 400 may focus, diffract, or otherwise modify light to provide enhanced lighting for enhanced lighting applications. In various embodiments, the enhanced building blocks may be transparent, may be translucent, may include a semi-transparent material comprised of a color, or may include a solid (e.g., opaque) material.

The enhanced building block may alter its appearance based on the presence of electrical current, an electric or magnetic field, sound vibration, or other external force. The electrical components 250 may include one or more piezoelectric components, and the piezoelectric components may be used to convert between mechanical and electrical inputs. For example, a quartz piezoelectric element may be included at one or both of the two vertices in the enhanced building block, and may be used to generate power for one or more electrical components 250. The piezoelectric element may be used for educational purposes. For example, two enhanced devices may detect proximity using a magnetic or other proximity detection mechanism, and the proximity detection may convey power to the piezoelectric element to generate a sound to indicate that the enhanced devices have been placed in the correct arrangement. One or more mechanical or electromechanical resonant devices may be used to modify, propagate, amplify, or mitigate externally applied vibration. For example, a mechanical tuning fork may be used to amplify vibration induced in a piezoelectric element. Sound vibration may be received through a planar surface or directly at a piezoelectric element, and the piezoelectric element may cause one or more electrical components 250 to alter color or intensity according to the pattern of received sound vibration.

In some embodiments, using electrochemical materials, application of an electrical current may transition one or more surfaces of the enhanced building block to translucent, clouded, or colored. A solid enhanced building block may be used to conduct vibration, such as in acoustic or other applications. For example, induced mechanical vibration may be used in vibration therapy. The enhanced building block may be constructed using a conductive material for various electrical applications. For example, one or more of the faces of the enhanced building block may be comprised of silicon, where the silicon is arranged to function as a resistor, inductor, capacitor, transistor, complete microchip (e.g., integrated circuit), or other electrical component. Multiple enhanced building blocks may be arranged to propagate conducted vibration. For example, a mechanical vibration may be generated by applying an electric current to a piezoelectric element in a first building block, and this vibration may be conducted by the second building block and converted to an electrical impulse.

The enhanced building block may be made of a transparent material, and may be of a uniform or nonuniform thickness. The enhanced building block may include one or more photovoltaic cells (e.g., solar cells), and may be used in solar power applications. For example, the cross-section of the enhanced building block may be convex or concave, and may be used as a lens in various optical applications. The enhanced building block may include various color patterns. Various additional ornamental designs may be used on each surface of the enhanced building block. Various designs may include lines comprised of magnetic tape, where information may be encoded or transferred using the magnetic tape. For example, standard magnetic tape encoders and readers may be used to record or read information encoded on a magnetic tape stripe on an exterior surface. Various designs may include lines comprised of electrically conductive materials, such as copper. The enhanced building block may be constructed using a flexible material to allow the three faces to expand or contract.

The lines within each enhanced device may be uniformly distributed. For example, a circular enhanced template may include a series of arcs radiating from the circle center to the circle radius, where each arc is spaced apart from adjacent arcs by forty-five degrees. Enhanced devices corresponding to this circular two-dimensional enhanced template may have corresponding arc portions, and the arc portions may aid the user in arranging the enhanced devices on the template. In other embodiments, the grid lines may be irregular in shape or spacing, may be configured in a fractal pattern, or may be configured in another arrangement.

The inner space may include one or more gasses, such as noble gasses or gasses that are translucent or colored. The inner space may include one or more fluids (e.g., gasses or liquids). The fluid may be selected according to its response to heating or cooling. In another example, a fluid with a high heat capacity may store energy received from solar heating, such as in concentrated solar power applications. The fluid may be selected according to its ability to change color or light absorption. For example, a suspended particle fluid may transition from a clouded appearance to a translucent appearance in the presence of an electrical voltage. Various levels of transparency or various shades of color may be used. The use of semi-transparent materials of various colors may allow the colors to be combined depending on orientation. For example, if the device is held so a blue face is superimposed on a yellow face, the object may appear green. Similarly, multiple enhanced building blocks may be combined to yield various colors. Multiple enhanced building blocks may be combined to form the appearance of various platonic solids, where the platonic solid appearance may depend on each enhanced building block's specific periodicities of motion and wave positions in time as indicated by the direction of particular intersecting linear projections. For example, the flanges of multiple enhanced building blocks 100 may be combined to form a larger enhanced device, such as is shown in FIGS. 2-4.

One or more of the standing wave block 200, equal and opposite block 300 or mated block 400 may be formed by combining various flanges or vertices. The flanges or other structural components may be combined or modified through internal physical features, such as through mechanical, electrical, electromechanical, magnetic, electromagnetic, or other features. For example, each flange may be constructed using a flexible, semi-flexible, or inflexible material to provide a hinged flange. For example, a flexible material may be used to provide a flexed hinge, which may allow overlapping flanges, such as overlapping flange 210 or flange 220 shown in FIG. 2. The flange hinges may be formed using semi-flexible or inflexible materials to create a mechanical hinge, such as a barrel hinge, a spring hinge, or other type of mechanical hinge. The flanges may be deflected (e.g., bent) or collapsed (e.g., closed), which may be used to collapse one or more flanges toward the inner volume of the enhanced building block to become flush (e.g., coplanar) with the respective contracted triangular surfaces. A fluid within the inner volume may expand or contract and cause one or more flanges to deflect or collapse.

The flanges may be collapsed or opened fully or partially through various methods. The flanges may be collapsed or opened by various active mechanical or electromechanical devices. These devices may include hydraulic actuators, servos, or other mechanical or electromechanical means. For example, the flanges or inner tetrahedral surfaces may contain magnetic or electromagnetic material, and one or more electromagnets may be energized selectively to collapse or open one or more flanges. An electromagnetic field may be used to cause movement of one or more flanges, or may be used to arrange two or more enhanced devices in a predetermined configuration in embodiments where the flanges define an inner volume, the flanges may be collapsed or opened by heating or cooling a fluid (e.g., increasing or decreasing molecular vibration) contained within the enhanced. For example, the fluid may be heated using solar energy, and the expanding fluid may fill the flanges and cause them to open. The flanges may be collapsed or opened by various passive methods, such as collapsing and opening opposing flanges alternatingly in response to a fluid. For example, a moving fluid such as wind may open a flange and cause the enhanced device to rotate around its axis of symmetry, and as the flange rotates into the wind, the wind may collapse that flange.

In some embodiments, the contracted triangular surfaces may also be collapsed or removed to allow nesting (e.g., stacking) of two or more enhanced building blocks. Two or more enhanced building blocks may be nested, and may be connected at one or more connection points via mechanical, magnetic, or by other means. Enhanced devices may be designed asymmetrically so that a series of enhanced building blocks may be connected to form a circle, polygon, or other shape. Any combination of nested enhanced devices may be used to form larger structures. Nested enhanced structures may be expanded or reinforced by adding additional building blocks.

Figure 3A:
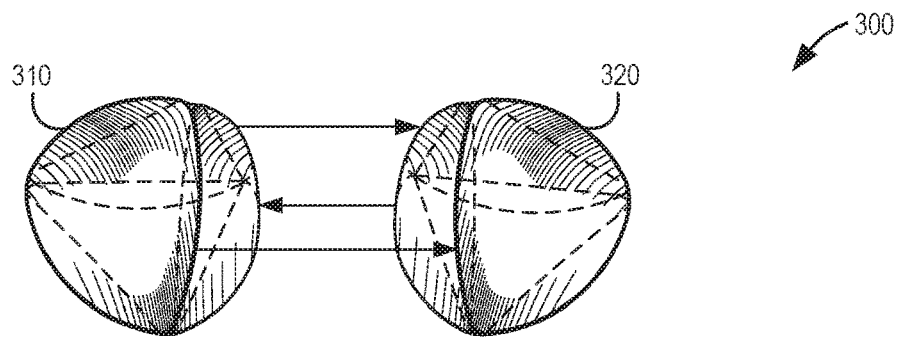
FIGS. 3A-3C are perspective views of two tetrahedral building blocks combined to form an equal and opposite block in accordance with an embodiment.
Figure 3B:
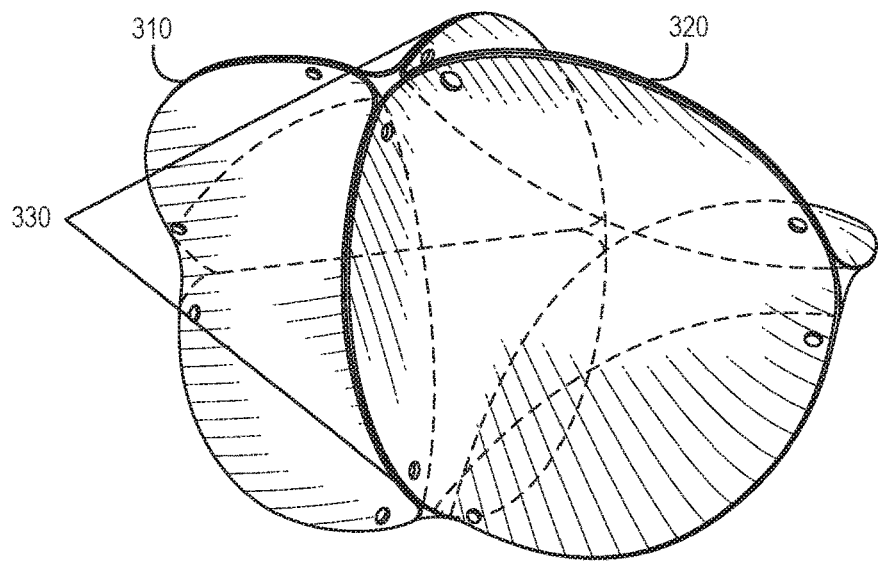
Figure 3C:
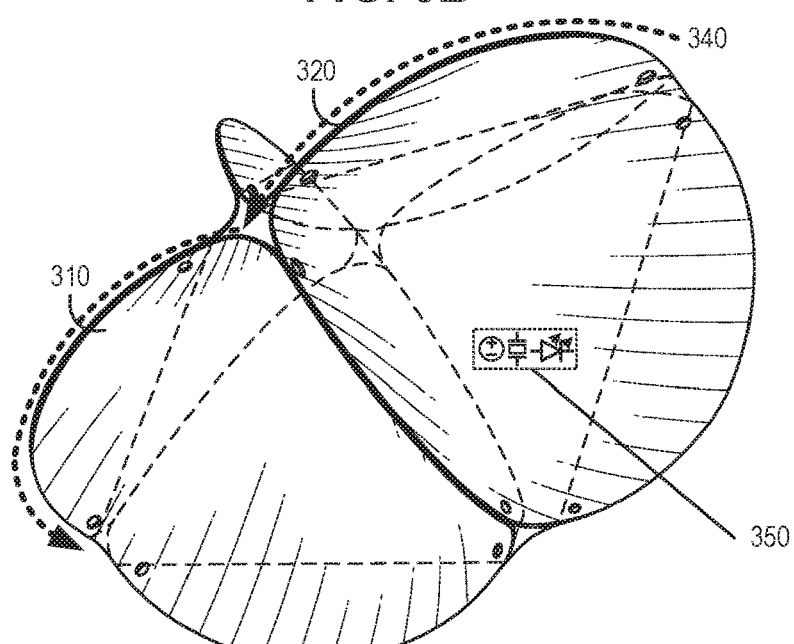

FIGS. 3A-3C are perspective views of two tetrahedral building blocks combined to form an equal and opposite block 300 in accordance with an embodiment. The equal and opposite block 300 may be formed by combining two tetrahedral building blocks on adjacent tetrahedral surfaces to form a medial disc 330. The equal and opposite block 300 may be formed such that flange 310 and flange 320 are substantially coplanar, and such that additional corresponding flanges are similarly substantially coplanar. The equal and opposite block 300 may be used to transfer energy, where the structure of the substantially coplanar flanges may be used to transfer energy. For example, a conductor 340 may be formed along an outer edge of flange 310 and flange 320 to conduct energy across the equal and opposite block 300, where the energy may be transferred to additional adjacent structures. The equal and opposite block 300 may include various electrical components 350, such as a power source, a piezoelectric element, a light source, or other electrical components described throughout this application.

Figure 4A:
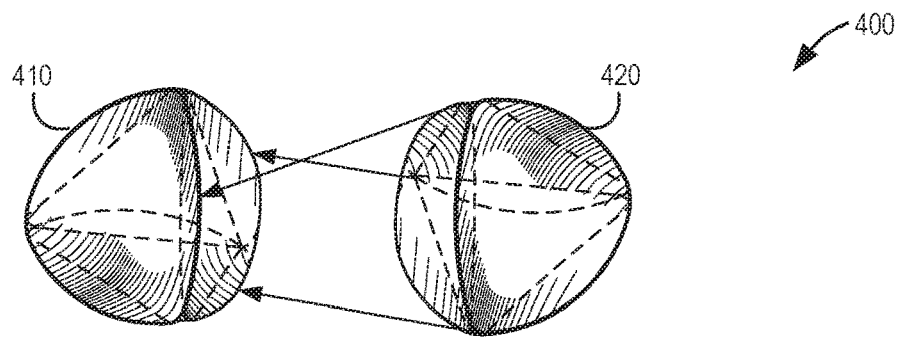
FIGS. 4A-4C are perspective views of two tetrahedral building blocks combined to form a mated block in accordance with an embodiment.
Figure 4B:
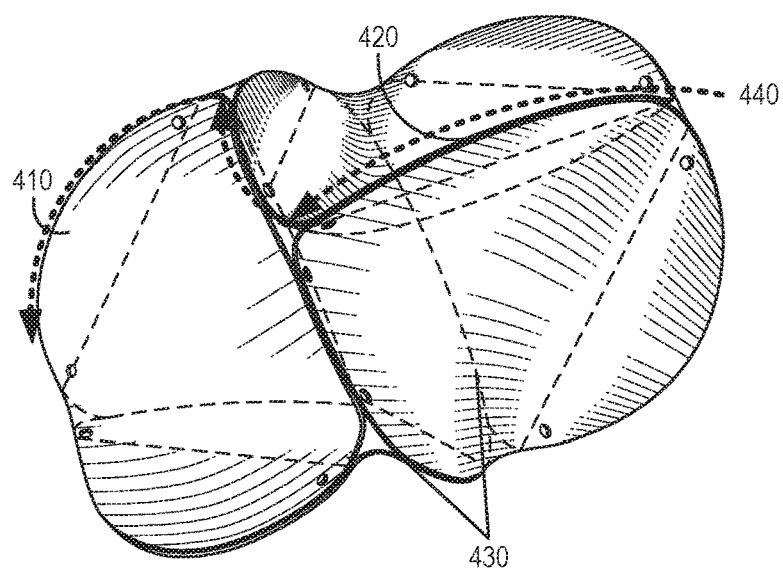
Figure 4C:
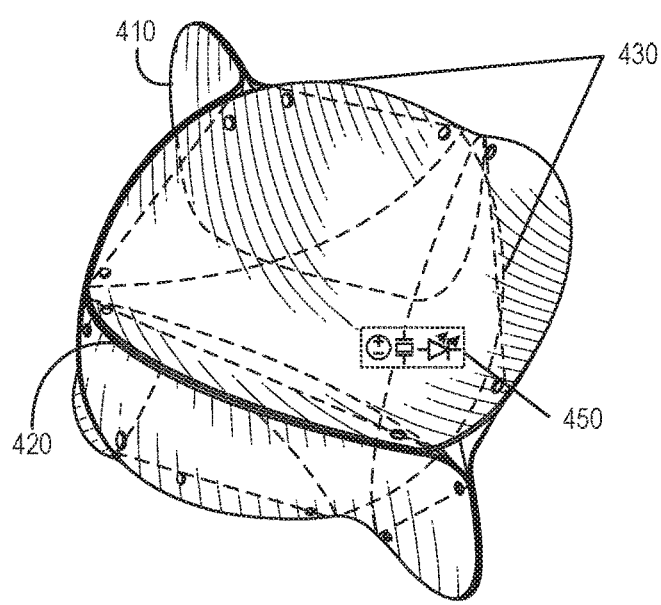

FIGS. 4A-4C are perspective views of two tetrahedral building blocks combined to form a mated block 400 in accordance with an embodiment. The mated block 400 may be formed by combining two tetrahedral building blocks on adjacent tetrahedral surfaces to form a medial disc 430. The mated block 400 may be formed such that flange 410 and flange 420 are offset by approximately sixty degrees, and such that additional corresponding flanges are similarly offset. The mated block 400 may be used to transfer energy, where the structure of the offset flanges may be used to convey or modify a transferred energy. For example, a conductor 440 may be formed along an outer edge of flange 410 and flange 420 to conduct energy across the mated block 400. The energy may be modified or conveyed to additional adjacent structures, such as by adjusting the phase of a power distribution system or modifying or reversing a polarity between two or more mated blocks 400. The mated block 400 may include various electrical components 450, such as a power source, a piezoelectric element, a light source, or other electrical components described throughout this application.

The standing wave block 200, equal and opposite block 300 or mated block 400 may include one or more conductive elements. The conductive elements may be used to receive or generate an electric signal. For example, one or more of the blocks 200-400 may be placed in a dielectric fluid, and conductive elements on the surface of one or more of the blocks 200-400 may be used to send or receive signals through the dielectric fluid. The conductive elements may be used to convey or generate an electric or magnetic field. For example, electromagnetic material may be included within or on the surface of one or more of the blocks 200-400. The generation of an electric or magnetic field may cause surrounding fluid or particles to move in a direction determined by the field, such as using electrohydrodynamic or magnetohydrodynamic means. For example, an electrostatic field may be generated within a dielectric fluid, and the electrostatic field may cause electrohydrodynamic motion within the fluid. Alternatively, a dielectric fluid may be electrified, and a magnetic field may be used to cause magnetohydrodynamic motion within the fluid. The fluid motion may be induced independently by various vertices or flanges, and the induced motion may be coordinated to cause one or more of the blocks 200-400 to move within a fluid medium in a selected direction, around a selected axis of rotation, or both.

One or more resonant members may be used within one or more of the blocks 200-400 to sustain or enhance the fluid propulsion. For example, a piezoelectric element may convert received mechanical vibration into an electric charge, and the electric charge may be used to control or power the generation of an electric field. A piezoelectric element may also be used to convert electrical energy into vibration, and the vibration may be used to induce motion in a surrounding fluid medium. For example, the timing of the positive and negative vibratory displacement of a portion of one or more of the blocks 200-400 may be selected to induce motion in the surrounding fluid. One or more directional flanges may be used to enhance the force of the positive displacement while decreasing the effect of the negative displacement, such as one or more retractable fins that allow fluid flow in one direction but generate drag in the opposite direction. One or more of the flanges may be deformed passively or actively to generate lift or drag across the surface. For example, when directing fluid motion in the direction of one of the flanges, one or more adjacent flanges may be distorted to enhance laminar fluid flow and reduce turbulent fluid flow.

The enhanced building blocks may be collapsed or opened fully or partially through various methods. The enhanced building blocks may be collapsed or opened by various active mechanical or electromechanical devices. These devices may include hydraulic actuators, servos, or other mechanical or electromechanical means. For example, the enhanced building blocks or inner tetrahedral surfaces may contain magnetic or electromagnetic material, and one or more electromagnets may be energized selectively to collapse or open one or more enhanced building blocks. An electromagnetic field may be used to cause movement of one or more enhanced building blocks, or may be used to arrange two or more enhanced devices in a predetermined configuration. In embodiments where the enhanced building blocks define an inner volume, the enhanced building blocks may be collapsed or opened by heating or cooling a fluid (e.g., increasing or decreasing molecular vibration) contained within the enhanced device. For example, the fluid may be heated using solar energy, and the expanding fluid may fill the enhanced building blocks and cause them to open. The enhanced building blocks may be collapsed or opened by various passive methods, such as collapsing and opening opposing enhanced building blocks alternatingly in response to a fluid. For example, a moving fluid such as wind may open a flange and cause the enhanced device to rotate around its axis of symmetry, and as the flange rotates into the wind, the wind may collapse that flange.

In some embodiments, the surfaces may also be collapsed or removed to allow nesting (e.g., stacking) of two or more collapsible structures or tetrahedral building blocks. Two or more collapsible structures or tetrahedral building blocks may be nested, and may be connected at one or more connection points via mechanical, magnetic, or by, other means. For example, a magnetic flange may adhere to magnetic inner volume. Multiple enhanced devices may be nested on one or more of the vertices of the contracted triangular faces. For example, multiple devices may be nested on the three bottom vertices to form a tripod configuration, and multiple devices may be nested on the top vertex to form a vertical column. In an additional example, a second nested tripod configuration could be arranged on the vertical column, where each of the three tripod legs serves as a counterbalance for the other two tripod legs. Enhanced devices may be designed asymmetrically so that a series of collapsible structures or tetrahedral building blocks may be connected to form a circle, polygon, or other shape. Any combination of nested enhanced devices may be used to form larger structures. Nested enhanced structures may be expanded or reinforced by adding additional shapes.

In some embodiments, multiple collapsible structures or tetrahedral building blocks may be connected to form a closed chain polygon (e.g., triangle, square, pentagon, etc.). The structures may be connected to each other by magnetic means, by soldering, or by other means. Alternatively, the collapsible structures or tetrahedral building blocks may be connected to a center hub using one or more spokes per collapsible structure. The connected structures may be configured to rotate around the center hub, such as in response to a fluid flow (e.g., gas or liquid). For example, the connected structures may be used in a turbine configuration, where each collapsible structure is configured to spill and catch air depending on the angles of the enhanced building blocks and orientations of the enhanced devices to cause the connected collapsible structures or tetrahedral building blocks to rotate. As another example, the connected structures may be used in a water wheel configuration, where water may contact outer enhanced building blocks and cause the connected structures to rotate. The structures may be adjusted to change the angular velocity, rotational direction, or other response of the connected structures to movement of a fluid across the surface of the enhanced devices. Adjustments may include collapsing or opening individual enhanced building blocks, or extending or retracting the respective structures relative to the hub. In embodiments where the structures are formed from or include a framework comprised of a conductive material, the connected structures may be arranged to form an antenna, such as for terrestrial or satellite communication. The connected structures may be used to conduct vibration, such as in acoustic applications, vibration therapy, or other applications. Other hydrodynamic or aerodynamic applications may be used. In addition to these macroscopic applications for a single or multiple collapsible structures or tetrahedral building blocks, collapsible structures or tetrahedral building blocks may be used in various microscopic applications such as nanotechnology. For example, multiple microscopic collapsible structures or tetrahedral building blocks may be configured to arrange themselves in a predefined structure in the presence of a magnetic field. Similarly, multiple microscopic collapsible structures or tetrahedral building blocks may be permanently arranged in a microscopic structure with predetermined properties, such as a resistor, inductor, capacitor, transistor, complete microchip, or other electrical component.

Example 1 is a building block comprising: a first tetrahedral block fixedly attached to a second tetrahedral block, each tetrahedral block including four vertices, six edges, and an arcuate hinged flange disposed on each of the six edges, wherein a first flange on the first tetrahedral block is fixedly attached to a second flange on the second tetrahedral block.

In Example 2, the subject matter of Example 1 optionally includes wherein: the first flange overlaps the second flange to form a vesica piscis structure; and the first tetrahedral block and the second tetrahedral block form a standing wave block.

In Example 3, the subject matter of any one or more of Examples 1-2 optionally include wherein: the first tetrahedral block is attached to the second tetrahedral block to form a first medial disc; the arcuate portion of the first flange overlaps the arcuate portion of the second flange to form a first circular segment of first medial disc; a third flange on the first tetrahedral block is arranged to be substantially coplanar with a fourth flange on the second tetrahedral block; and the first tetrahedral block and the second tetrahedral block form an equal and opposite block.

In Example 4, the subject matter of any one or more of Examples 1-3 optionally include wherein: the first tetrahedral block is attached to the second tetrahedral block to form a second medial disc; a fifth flange on the first tetrahedral block is arranged to be substantially coplanar with a sixth flange on the second tetrahedral block; and the first tetrahedral block and the second tetrahedral block form a mated block.

In Example 5, the subject matter of any one or more of Examples 1-4 optionally include a light source embedded in at least one of the first tetrahedral block and second tetrahedral block.

In Example 6, the subject matter of Example 5 optionally includes a power source electrically connected to the light source, the power source embedded in at least one of the first tetrahedral block and second tetrahedral block.

In Example 7, the subject matter of Example 6 optionally includes wherein the power source includes at least one of a capacitor, a battery, and a solar cell.

In Example 8, the subject matter of any one or more of Examples 6-7 optionally include wherein the power source includes a piezoelectric element electrically connected to the light source, wherein: the piezoelectric element configured to generate an electric charge in response to vibration; and the light source is configured to provide electroluminescence in response to an electric charge generated by piezoelectric element.

In Example 9, the subject matter of Example 8 optionally includes wherein the piezoelectric element is electrically connected to the electromagnetic material and configured to cause at least one of the arcuate hinged flanges to deflect in response to the electric charge generated by piezoelectric element.

In Example 10, the subject matter of any one or more of Examples 8-9 optionally include a first acoustic resonator embedded in at least one of the first tetrahedral block and second tetrahedral block to induce a vibration in the piezoelectric element, wherein: the first acoustic resonator is tuned to resonate at a selected frequency; and the first acoustic resonator is configured to resonate sympathetically with a second acoustic resonator, and wherein the second acoustic resonator is external to the first tetrahedral block and second tetrahedral block.

In Example 11, the subject matter of any one or more of Examples 110 optionally include a first electrically conductive line embedded in the first tetrahedral block; and a second electrically conductive line embedded in the second tetrahedral block, the second electrically conductive line conductively coupled to the first electrically conductive line.

In Example 12, the subject matter of Example 11 optionally includes wherein the first electrically conductive line and the second electrically conductive line form a helical conductive structure.

In Example 13, the subject matter of any one or more of Examples 11-12 optionally include wherein the helical conductive structure includes at least one of an inductor; a solenoid, a helical antenna, and a helical transmission line.

Example 14 is a kit comprising: a first group of four discs configured to be arranged as a first tetrahedral block; and a second group of four discs configured to be arranged as a second tetrahedral block, wherein: each tetrahedral block includes four vertices, six edges, and an arcuate hinged flange disposed on each of the six edges; and a first flange on the first tetrahedral block is fixedly attached to a second flange on the second tetrahedral block.

In Example 15, the subject matter of Example 14 optionally includes wherein: the first flange overlaps the second flange to form a vesica piscis structure; and the first tetrahedral block and the second tetrahedral block form a standing wave block.

In Example 16, the subject matter of any one or more of Examples 14-15 optionally include wherein: the first tetrahedral block is attached to the second tetrahedral block to form a first medial disc; the arcuate portion of the first flange overlaps the arcuate portion of the second flange to form a first circular segment of first medial disc; a third flange on the first tetrahedral block is arranged to be substantially coplanar with a fourth flange on the second tetrahedral block; and the first tetrahedral block and the second tetrahedral block form an equal and opposite block.

In Example 17, the subject matter of any one or more of Examples 14-16 optionally include wherein: the first tetrahedral block is attached to the second tetrahedral block to form a second medial disc; a fifth flange on the first tetrahedral block is arranged to be substantially coplanar with a sixth flange on the second tetrahedral block; and the first tetrahedral block and the second tetrahedral block form a mated block.

In Example 18, the subject matter of any one or more of Examples 14-17 optionally include a light source embedded in at least one of the first tetrahedral block and second tetrahedral block.

In Example 19, the subject matter of Example 18 optionally includes a power source electrically connected to the light source, the power source embedded in at least one of the first tetrahedral block and second tetrahedral block.

In Example 20, the subject matter of Example 19 optionally includes wherein the power source includes at least one of a capacitor, a battery, and a solar cell.

In Example 21, the subject matter of any one or more of Examples 19-2.0 optionally include wherein the power source includes a piezoelectric element electrically connected to the light source, wherein: the piezoelectric element configured to generate an electric charge in response to vibration; and the light source is configured to provide electroluminescence in response to an electric charge generated by piezoelectric element.

In Example 22, the subject matter of Example 21 optionally includes wherein the piezoelectric element is electrically connected to the electromagnetic material and configured to cause at least one of the arcuate hinged flanges to deflect in response to the electric charge generated by piezoelectric element.

In Example 23, the subject matter of any one or more of Examples 21-22 optionally include a first acoustic resonator embedded in at least one of the first tetrahedral block and second tetrahedral block to induce a vibration in the piezoelectric element, wherein: the first acoustic resonator is tuned to resonate at a selected frequency; and the first acoustic resonator is configured to resonate sympathetically with a second acoustic resonator, and wherein the second acoustic resonator is external to the first tetrahedral block and second tetrahedral block.

In Example 24, the subject matter of any one or more of Examples 14-23 optionally include a first electrically conductive line embedded in the first tetrahedral block; and a second electrically conductive line embedded in the second tetrahedral block, the second electrically conductive line conductively coupled to the first electrically conductive line.

In Example 25, the subject matter of Example 24 optionally includes wherein the first electrically conductive line and the second electrically conductive line form a helical conductive structure.

In Example 26, the subject matter of any one or more of Examples 24-25 optionally include wherein the first electrically conductive line and the second electrically conductive line form an inductor, a solenoid, a helical antenna, and a helical transmission line.

This invention is intended to cover all changes and modifications of the example embodiments described herein that do not constitute departures from the scope of the claims.

What is claimed is:

1. A building block comprising:
   a first tetrahedral block;
   a second tetrahedral block fixedly attached to the first tetrahedral block, each tetrahedral block including four vertices, six edges, and an arcuate hinged flange disposed on each of the six edges, wherein a first flange on the first tetrahedral block is fixedly attached to a second flange on the second tetrahedral block;
   a first electrically conductive line embedded in an outer edge of an arcuate hinged flange on the first tetrahedral block; and
   a second electrically conductive line embedded in an outer edge of an arcuate hinged flange on the second tetrahedral block, the second electrically conductive line conductively coupled to the first electrically conductive line to form a conductive helical structure;
   wherein the first tetrahedral block and second tetrahedral block are arranged along a common cylindrical axis to form a linear tetrahedral block chain with a substantially cylindrical outer profile.

2. The building block of claim 1, wherein:
   the first flange overlaps the second flange to form a vesica piscis structure; and
   the first tetrahedral block and the second tetrahedral block form a standing wave block.

3. The building block of claim 1, wherein:
   the first tetrahedral block is attached to the second tetrahedral block to form a first medial disc;

the arcuate portion of the first flange overlaps the arcuate portion of the second flange to form a first circular segment of first medial disc;

a third flange on the first tetrahedral block is arranged to be substantially coplanar with a fourth flange on the second tetrahedral block; and the first tetrahedral block and the second tetrahedral block form an equal and opposite block.

4. The building block of claim 1, wherein:

the first tetrahedral block is attached to the second tetrahedral block to form a second medial disc;

a fifth flange on the first tetrahedral block is arranged to be substantially coplanar with a sixth flange on the second tetrahedral block; and the first tetrahedral block and the second tetrahedral block form a mated block.

5. The building block of claim 1, further comprising a light source embedded in at least one of the first tetrahedral block and second tetrahedral block.

6. The building block of claim 5, further comprising a power source electrically connected to the light source, the power source embedded in at least one of the first tetrahedral block and second tetrahedral block.

7. The building block of claim 6, wherein the power source includes a piezoelectric element electrically connected to the light source, wherein:

the piezoelectric element configured to generate an electric charge in response to vibration; and the light source is configured to provide electroluminescence in response to an electric charge generated by piezoelectric element.

8. The building block of claim 7, further comprising a first acoustic resonator embedded in at least one of the first tetrahedral block and second tetrahedral block to induce a vibration in the piezoelectric element, wherein:

the first acoustic resonator is tuned to resonate at a selected frequency; and the first acoustic resonator is configured to resonate sympathetically with a second acoustic resonator, and wherein the second acoustic resonator is external to the first tetrahedral block and second tetrahedral block.

9. The building block of claim 1, wherein the helical conductive structure includes at least one of an inductor, a solenoid, a helical antenna, and a helical transmission line.

10. A kit comprising:

a first group of four discs configured to be arranged as a first tetrahedral block; and a second group of four discs configured to be arranged as a second tetrahedral block, wherein:

each tetrahedral block includes four vertices, six edges, and an arcuate hinged flange disposed on each of the six edges;

a first flange on the first tetrahedral block is fixedly attached to a second flange on the second tetrahedral block;

a first electrically conductive line embedded in an outer edge of an arcuate hinged flange on the first tetrahedral block; and a second electrically conductive line embedded in an outer edge of an arcuate hinged flange on the second tetrahedral block, the second electrically conductive line conductively coupled to the first electrically conductive line to form a conductive helical structure;

wherein the first tetrahedral block and second tetrahedral block are arranged along a common cylindrical axis to form a linear tetrahedral block chain with a substantially cylindrical outer profile.

11. The kit of claim 10, wherein:

the first flange overlaps the second flange to form a vesica piscis structure; and the first tetrahedral block and the second tetrahedral block form a standing wave block.

12. The kit of claim 10, wherein:

the first tetrahedral block is attached to the second tetrahedral block to form a first medial disc;

the arcuate portion of the first flange overlaps the arcuate portion of the second flange to form a first circular segment of first medial disc;

a third flange on the first tetrahedral block is arranged to be substantially coplanar with a fourth flange on the second tetrahedral block; and the first tetrahedral block and the second tetrahedral block form an equal and opposite block.

13. The kit of claim 10, wherein:

the first tetrahedral block is attached to the second tetrahedral block to form a second medial disc;

a fifth flange on the first tetrahedral block is arranged to be substantially coplanar with a sixth flange on the second tetrahedral block; and the first tetrahedral block and the second tetrahedral block form a mated block.

14. The kit of claim 10, further comprising a light source embedded in at least one of the first tetrahedral block and second tetrahedral block.

15. The kit of claim 14, further comprising a power source electrically connected to the light source, the power source embedded in at least one of the first tetrahedral block and second tetrahedral block.

16. The kit of claim 15, wherein the power source includes a piezoelectric element electrically connected to the light source, wherein:

the piezoelectric element configured to generate an electric charge in response to vibration; and the light source is configured to provide electroluminescence in response to an electric charge generated by piezoelectric element.

17. The kit of claim 16, further comprising a first acoustic resonator embedded in at least one of the first tetrahedral block and second tetrahedral block to induce a vibration in the piezoelectric element, wherein:

the first acoustic resonator is tuned to resonate at a selected frequency; and the first acoustic resonator is configured to resonate sympathetically with a second acoustic resonator, and wherein the second acoustic resonator is external to the first tetrahedral block and second tetrahedral block.

18. The kit of claim 10, wherein the conductive helical structure formed by the first electrically conductive line and the second electrically conductive line form an inductor, a solenoid, a helical antenna, and a helical transmission line.

* * * * *